United States Patent
Ohsumi et al.

[11] Patent Number: 6,052,552
[45] Date of Patent: Apr. 18, 2000

[54] IMAGE FORMING APPARATUS WITH SKEW CORRECTION

[75] Inventors: Kiyotaka Ohsumi, Kawasaki; Akio Ohno, Yokohama, both of Japan

[73] Assignee: Canon Kabushiki Kaisha, Tokyo, Japan

[21] Appl. No.: 08/995,908

[22] Filed: Dec. 22, 1997

[30] Foreign Application Priority Data

Dec. 26, 1996 [JP] Japan .................................. 8-356945

[51] Int. Cl.⁷ .................................................. G03G 15/00
[52] U.S. Cl. ........................ 399/394; 347/116; 347/248; 399/395
[58] Field of Search .................................. 399/388, 394, 399/395, 396; 347/116, 132, 234, 248

[56] References Cited

U.S. PATENT DOCUMENTS

| | | | |
|---|---|---|---|
| 4,755,855 | 7/1988 | Watanabe | 399/394 |
| 4,814,792 | 3/1989 | Yamanobe et al. | 347/248 |
| 4,914,485 | 4/1990 | Emori | 347/116 |
| 5,093,674 | 3/1992 | Storlie | 347/116 |
| 5,134,427 | 7/1992 | Akiyama et al. | |
| 5,600,421 | 2/1997 | Takekoshi et al. | 399/66 |

FOREIGN PATENT DOCUMENTS

| | | |
|---|---|---|
| 8095432 | 4/1996 | Japan . |
| 8305098 | 11/1996 | Japan . |

*Primary Examiner*—William Royer
*Assistant Examiner*—William A. Noé
*Attorney, Agent, or Firm*—Fitzpatrick, Cella, Harper & Scinto

[57] ABSTRACT

An image forming apparatus for forming an image on a recording material. The position of the recording material is detected when the recording material is underway from a registration roller for correcting a skew of the recording material to an image forming position for the recording material, and the image is written based on the detected position signal. The image is thus formed at a proper position on the recording material.

19 Claims, 6 Drawing Sheets

IMAGE FORMING APPARATUS WITH SKEW CORRECTION

BACKGROUND OF THE INVENTION

1. Field of the Invention

The present invention relates to an image forming apparatus such as a copying machine and a printer.

2. Description of the Related Art

One type of image forming apparatuses available is an electrophotographic machine in which an image light beam bearing image information of an original document is directed to a photoconductive drum to form a latent image thereon, a development unit applies toner to the photoconductive drum to develop a toner image thereon, the toner image is then transferred to a copy sheet as a recording material, and the copy sheet is passed through a fixing unit which thermally fuses the toner to fix the image onto the copy sheet.

FIG. 5 shows a full-color copying machine, for example, and the transportation of a copy sheet is now briefly discussed.

A copy sheet is fed from cassette C1 or C2 or a manual-feeding unit C3. When the forward edge of the copy sheet abuts registration rollers 101, the correction of skew of the copy sheet is performed.

The registration rollers 101 start rotating in synchronization with image write timing on the photoconductive drum. The registration rollers 101 transport the copy sheet to a transfer belt 102, which in turn transports the copy sheet to an image developing unit.

As shown in FIG. 6A, the on timing of the registration rollers 101 is set such that an image to be formed is aligned at the center of the copy sheet with a predetermined margin (top margin) x permitted in the direction of paper advance.

(Left and right) side margins y with respect to the direction of advance are set by fine-adjusting, in the direction of main scan, emission timing of an image forming laser beam that is projected to the photoconductive drum, after the positions of the cassettes C1 and C2 and the manual-feeding unit C3 are adjusted relative to the photoconductive drum in alignment.

In the conventional art, the adjustment of the top margin x and side margins y is usually performed during manufacturing steps in a plant or performed in the field by service engineers and is not the responsibility of users.

The top margin x and side margins y are thus determined by the initial setting of the machine including the on timing of the registration roller. The skew (oblique running) of the copy sheet is corrected when the forward edge of the copy sheet abuts the registration roller. However, there are times when the copy sheet shifts laterally in a direction (y direction in FIG. 6) perpendicular to the direction of paper advance in the course of skew correction.

Japanese Patents Laid-Open No. 8-95432 and No. 8-305098 disclose the techniques that shift the image write position on the photoconductive drum according to the lateral shift of the copy sheet in the y direction.

The inventors of this invention have learned that the forward margin x varies when the forward edge of copy sheet is introduced into the nib of the registration rollers differently depending on the type of copy sheets (for example, thickness and strength), when an error takes place in the transport speed of copy sheet, or when the on timing of the registration rollers varies depending on errors in gear meshing and clutch response time even if the same type of copy sheets are used.

For these variations, the image (hatched portion) shown in FIG. 6A that is intended in the original setting of the machine is deviated (by, for example, the amounts $\alpha$ and $\beta$ in the x and y directions, respectively) in practice as shown in FIG. 6B or FIG. 6C with no margin left on one side or even the image partly falling outside the copy sheet. Such a trend is more pronounced in a large machine or when the distance from the cassette to the registration rollers is longer.

There is a growing demand that the image forming apparatuses including copying machines work with relatively large sheet sizes besides widely used standard sheet sizes such as sheet sizes A and B. For example, large size sheets, such as the ones used in the printing industry, are printed and then cut into A and B sheet sizes. Although higher accuracy is required of the image forming apparatus in image forming position on a copy sheet in such an application, the conventional art fails to meet such accuracy requirement.

SUMMARY OF THE INVENTION

Accordingly, it is one object of the present invention to provide an image forming apparatus that forms an image at a proper position on a recording material.

It is yet another object of the present invention to provide an image forming apparatus that forms an image at a proper position on a recording material by detecting a deviation of the recording material in the direction of advance.

It is yet a further object of the present invention to provide an image forming apparatus that forms an image at a proper position on a recording material by detecting a deviation of the recording material in the direction perpendicular to the direction of advance.

It is yet a further object of the present invention to provide an image forming apparatus that comprises image forming means for forming an image at a proper position on the recording material, correct means for correcting skew of the recording material advancing to an image forming position, detector means for detecting the position of the recording material that is underway from the position of the correct means to the image forming position, and control means for controlling the image forming means in accordance with the output of the detector means.

These and other objects and advantages of the present invention will become apparent from the following description, the accompanying drawings and the appended claims.

DESCRIPTION OF THE PREFERRED EMBODIMENTS

Figure 1:
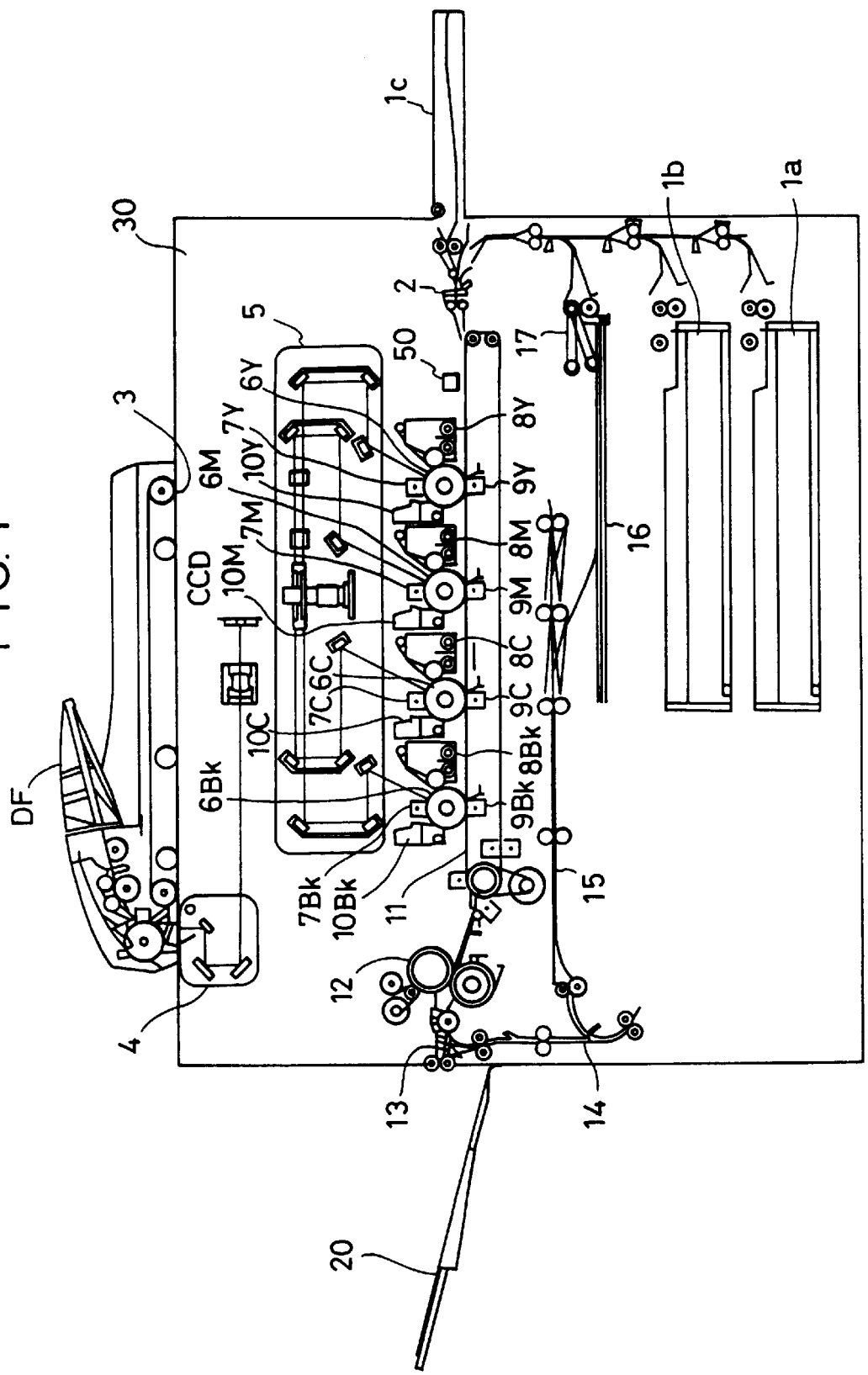
FIG. 1 is a cross-sectional view showing a first embodiment of image forming apparatus of the present invention.

Referring now to the drawings, the embodiments of the present invention are discussed. It is understood that the scope of the present invention is not limited to the dimensions, materials, shapes and relative positions of the elements to be described in the embodiments unless otherwise specifically described.

First Embodiment

The image forming apparatus of a first embodiment of the present invention is now discussed. In the first embodiment, the present invention is implemented in a full-color copying machine. The present invention is implemented in a full-color machine for the convenience of discussion of a plurality of functions of the present invention and it is not intended to limit the present invention to the full-color copying machine.

FIG. 1 is a cross-sectional view of a full-color copying machine.

First, the apparatus body 30 of the full-color machine is briefly discussed.

A user presses a start button (not shown) with an original document (not shown) placed on the automatic document feeder DF. A copy sheet (paper) as a recording material is supplied by cassette 1a or 1b or manual-feeding unit 1c. The copy sheet stays in contact with a registration roller 2 to wait for the timing of an image forming section and to correct its skew as well. Meanwhile, the original document is transported to a document carriage platen 3, and is scanned by an optical system 4. The image of the original document is thus read by a CCD, and is separated into a yellow image (Y), magenta image (M), cyan image (C) and black image (Bk).

The registration rollers 2 are then rotated and a linear sensor 50 as sensor means for paper edge detector means detects the accurate position of the copy sheet on a transfer belt 11 as recording material transport means. The copy sheet is attracted to the transfer belt 11 by static charge and is transferred along with the transfer belt 11, without slipping off the transfer belt 11. To assist the transfer belt 11 to attract the copy sheet, means such as an attracting roller may be employed.

With the linear sensor 50 detecting the position of the copy sheet, an image forming light projection section 5 flashes laser beams for Y, M, C and Bk components in accordance with image information at image forming positions and projects sequentially respectively the Y, M, C and Bk laser beams to photoconductive drums 6Y, 6M, 6C and 6Bk, as image bearing media, all of which are already uniformly pre-charged by primary charging units 7Y, 7M, 7C and 7Bk, respectively, to form latent images.

Development units 8Y, 8M, 8C and 8Bk apply toner to the respective latent images for development, and transfer charging units 9Y, 9M, 9C and 9Bk transfer the respective resulting toner images to the copy sheet that is being transported by the transfer belt 11. Also provided are cleaning units 10Y, 10M, 10C and 10Bk which remove toner residues on the respective photoconductive drums 6Y, 6M, 6C and 6Bk for cleaning after transfer. In this way the toner images on the respective photoconductive drums are transferred to the copy sheet on the transfer belt 11 at the image forming positions so that image forming is sequentially performed color by color on the same copy sheet.

The copy sheet is then sent to a fixing unit 12, where the toner images are thermally fused for fixing. The copy sheet is then delivered out of the apparatus and stacked into a tray 20.

To form images on both sides of the copy sheet, a flapper 13 arranged in front of a both-side copying transport path guides the copy sheet S to an turnaround section 14, where the copy sheet S is turned around, and is transported via the path 15 and then placed on an intermediate tray 16. After the original document is replaced, a re-feed section 17 re-feeds the copy sheet to subject the bottom side of the copy sheet to image forming process and is then stacked into the tray 20 outside the apparatus body.

Figure 2:
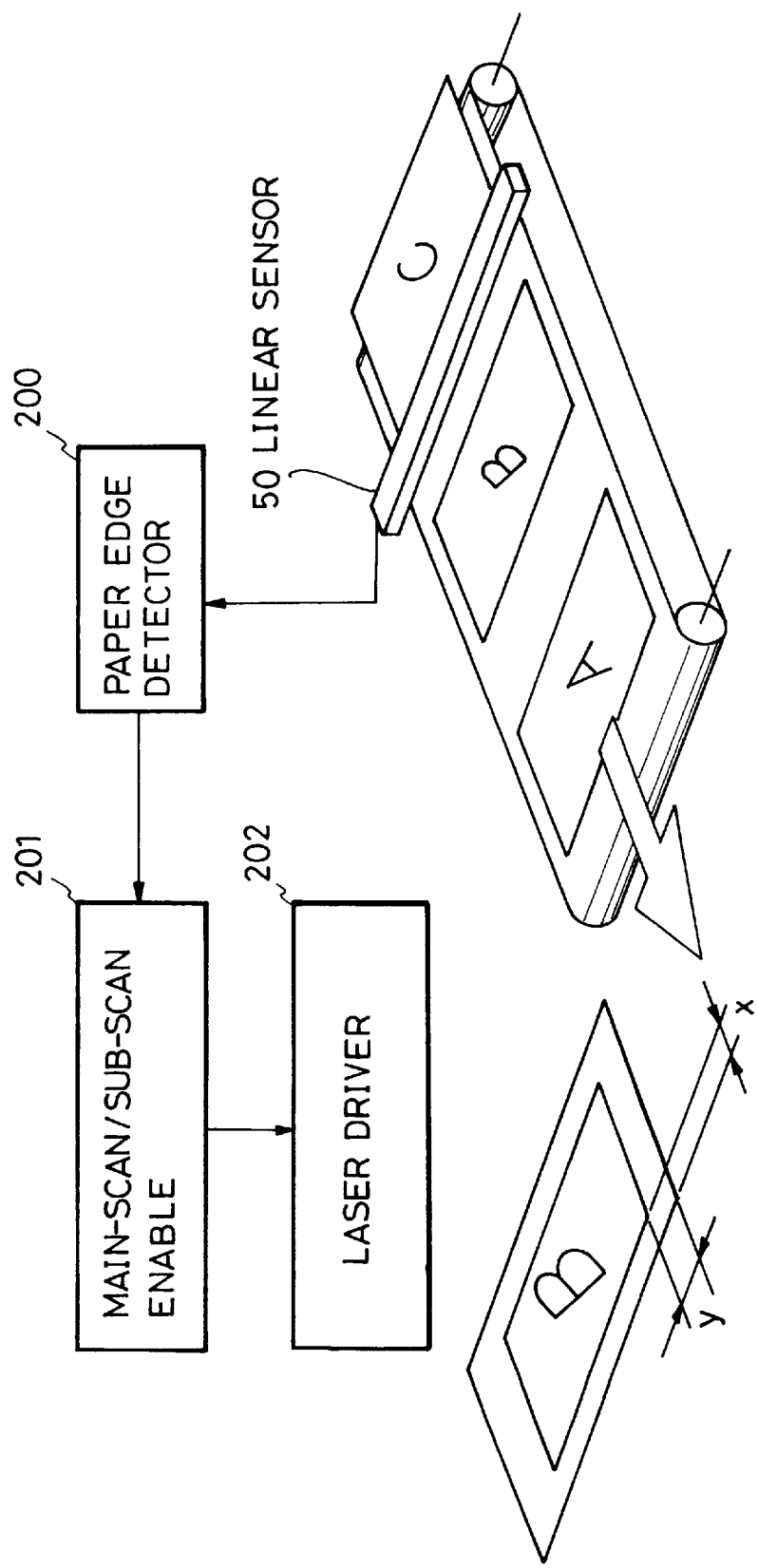
FIG. 2 diagrammatically illustrates an image forming position on a copy sheet in the first embodiment of the image forming apparatus of the present invention shown FIG. 1.

Accuracy improvements in image forming position in the image forming apparatus of the first embodiment are now discussed referring to FIG. 2.

As shown, three sheets, designated A, B and C, are now placed on the transfer belt. Each sheet had been corrected in skew by the registration roller before it was sent to the transfer belt 11. The positions of the copy sheets on the transfer belt 11, namely thrust positions relative to the photoconductor drums (in the direction perpendicular to the direction of advance of sheets), are subject to slight variations, after the registration roller 2 corrected skew of each sheet. The degree of variations is more pronounced as the distance between the sheet feeding position of sheets and the registration roller 2 is larger. Furthermore, the degree of variations is more pronounced when the copy sheet is not reliably restrained by lateral restraint means (not shown) arranged in the cassette or when the copy sheets are not uniform.

The use of the manual-feeding unit permits the full-color copying machine of the present invention to transport a diversity of copy sheets. The copy sheets may be thin sheets, thick sheets, film sheets such as OHP film, and Japanese paper sheets, and even cloth. Such a diversity of sheets abut the registration roller 2 in different ways, and their top margins are accordingly varied.

Even copy sheets of the same type suffer position variations because the on timing of the registration rollers is affected by gear meshing and response time of a clutch.

The deviation of the image forming positions of the copy sheet in the direction of advance and the direction perpendicular to the direction of advance must be precluded. The linear sensor 50 is thus arranged to detect the forward edge of the copy sheet upstream of a transfer process (in the image forming position) as shown in FIG. 2. In this embodiment, a CCD sensor covers entirely the width of the copy sheet as shown in FIG. 2. Alternatively, the sensor is arranged to cover one lateral side portion only when the sheets are aligned to one side.

The linear sensor 50 detects the forward edge and left and right side edges (200). Based on these data, the image forming timings by the laser onto the photoconductive drum is determined in the direction of paper advance and in the direction perpendicular to the direction of paper advance (201). The timing information is fed back to a laser driver (202) to form an image on the photoconductive drum.

To keep constant the forward margin x in FIG. 2, the emission of laser beam is timed in consideration of four factors, namely the transport speed of the transfer belt, the distance between the position of the linear sensor 50 and transfer position, and the distance from the exposure position to transfer position on the photoconductive drum, and the circumferential speed of the photoconductive drum.

Figure 3:
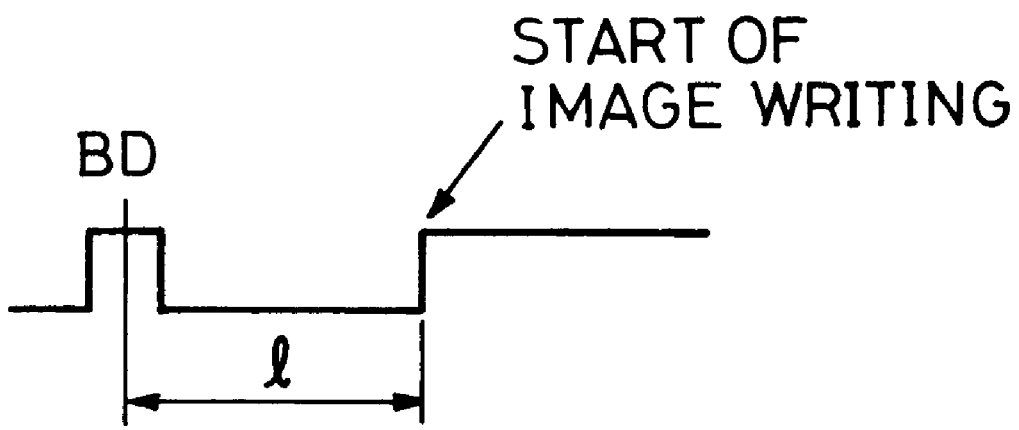
FIG. 3 is illustrates an emission timing of laser in the first embodiment of the image forming apparatus of the present invention shown in FIG. 1.

The left and right side margins y are determined by the timing of image forming by the laser on the photoconductive drum as shown in FIG. 3.

The emission of the laser is started l seconds after detecting the laser with a BD (beam detect) sensor in a laser scanner. The value l is adjusted by changing the timing of laser emission in accordance with the position of the sheet detected by the linear sensor 50, and the left and right side margins are thus determined.

In the conventional art, the image forming timing is determined solely depending on the on timing of the registration roller 2. In this embodiment, the forward edge of the copy sheet on the transfer belt 11 underway to the transfer position for the actual image transfer is detected upstream of the transfer position, and image forming is performed based on the detected signal. The image forming position is thus accurately adjusted.

Accurate adjustment of the image forming position is particularly important in both-side printing operation when copy sheets are later bound into a book. If no accurate alignment is assured between images on the top side and bottom side of each copy sheet, subsequent cutting of the copy sheets may partly cut away the images. The present invention precludes such a problem.

This embodiment has been discussed in connection with the full-color copying machine. The present invention is not only implemented in the full-color copying machine but also in image forming apparatuses including black-white copying machines, printers and facsimile machines The laser is used as image forming means for forming images on the photoconductive drum. Alternatively, exposure means such as LEDs and liquid-crystal shutters may be used.

The photoconductive drum as the photoconductive body is used in the above embodiment. Alternatively, a photoconductive belt may be used.

Second Embodiment

Figure 4:
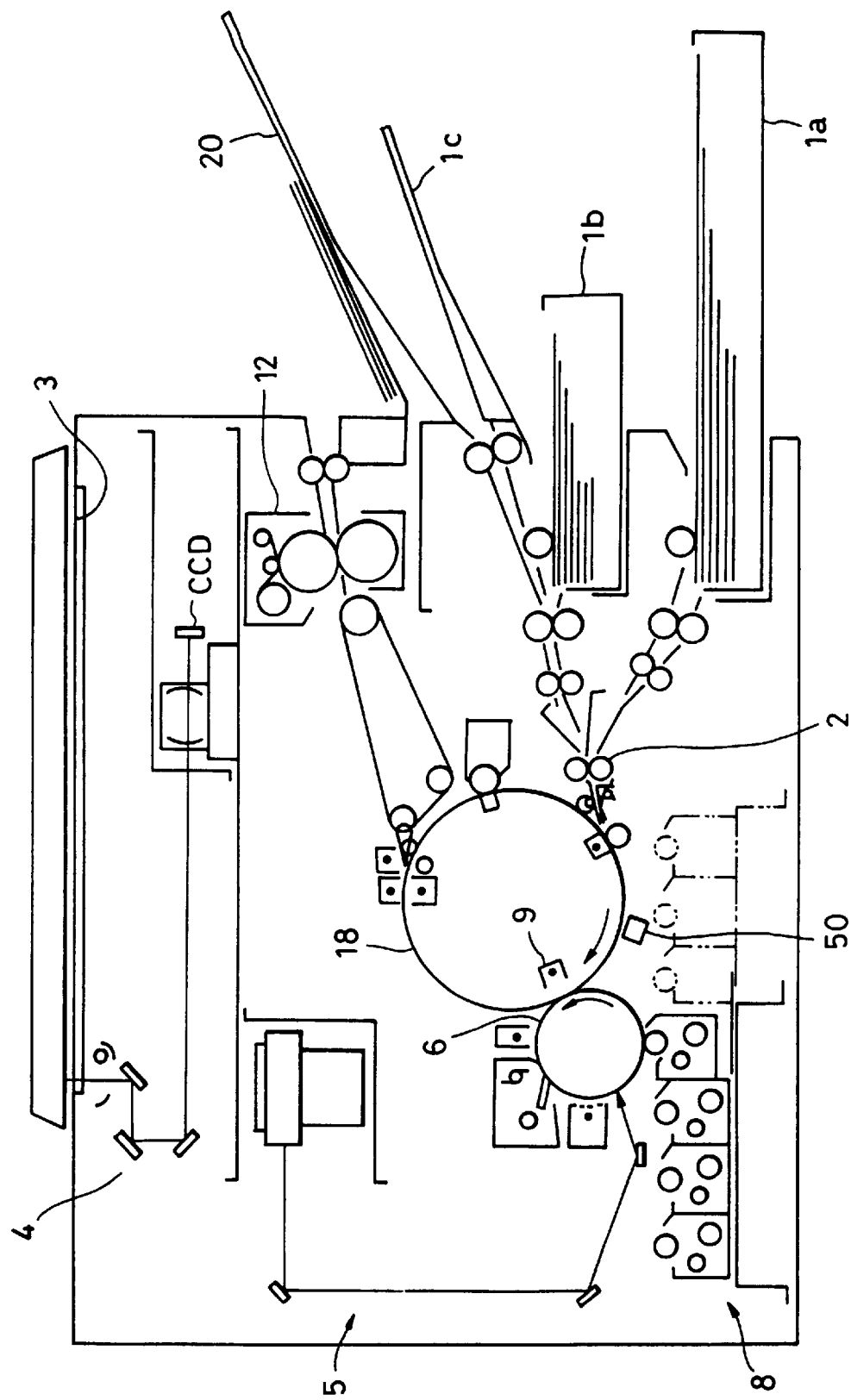
FIG. 4 is a cross-sectional view showing a second embodiment of image forming apparatus of the present invention.
Figure 5:
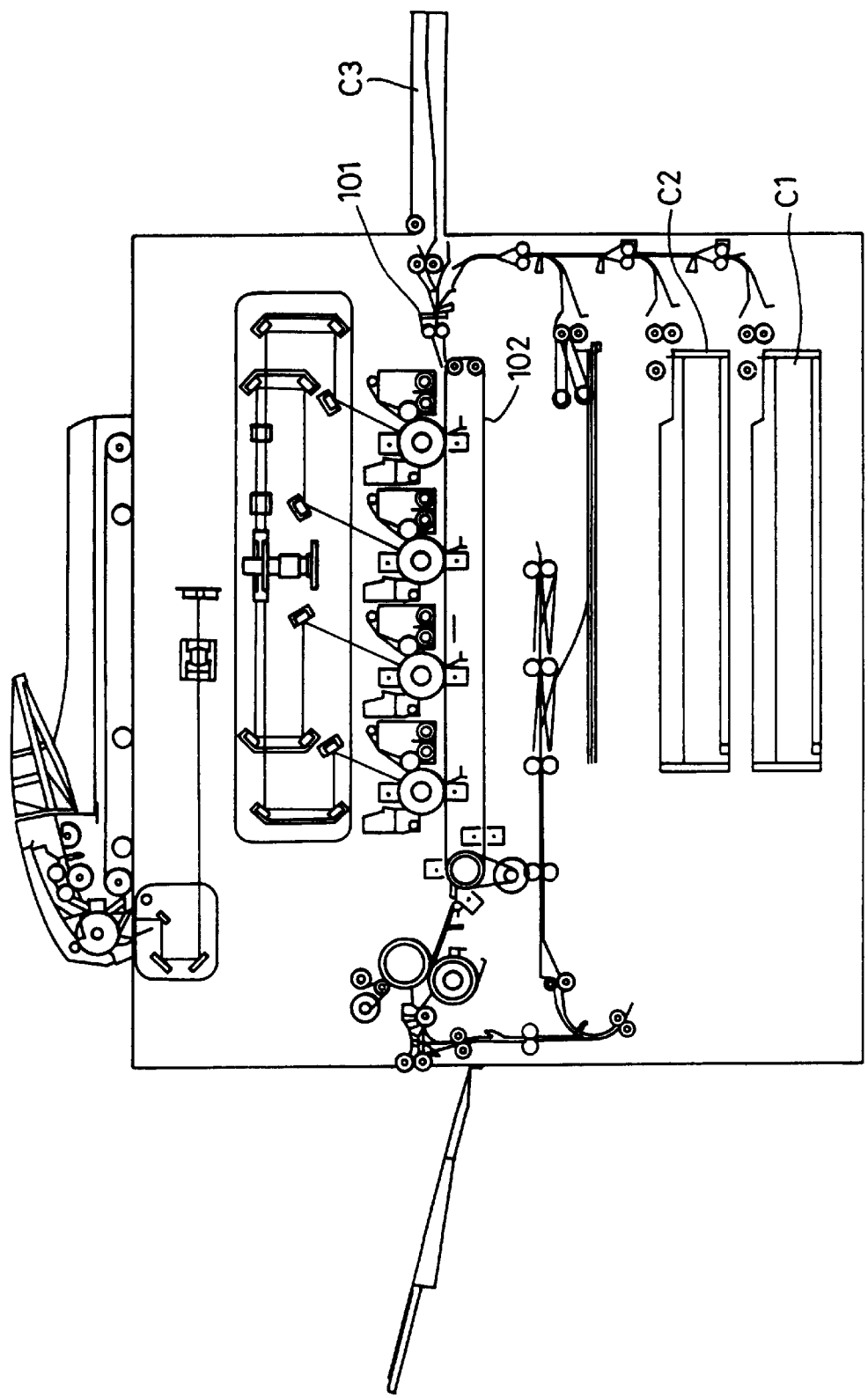
FIG. 5 is a cross-sectional view showing a conventional image forming apparatus.
Figure 6C:
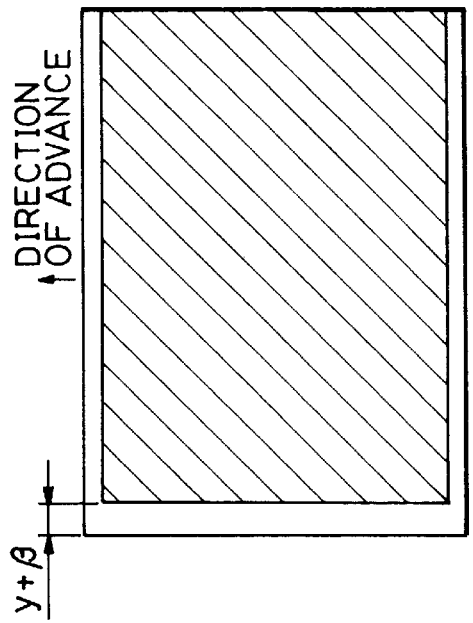
FIG. 6 diagrammatically illustrates an image forming position on a copy sheet in the conventional image forming apparatus.
Figure 6A:
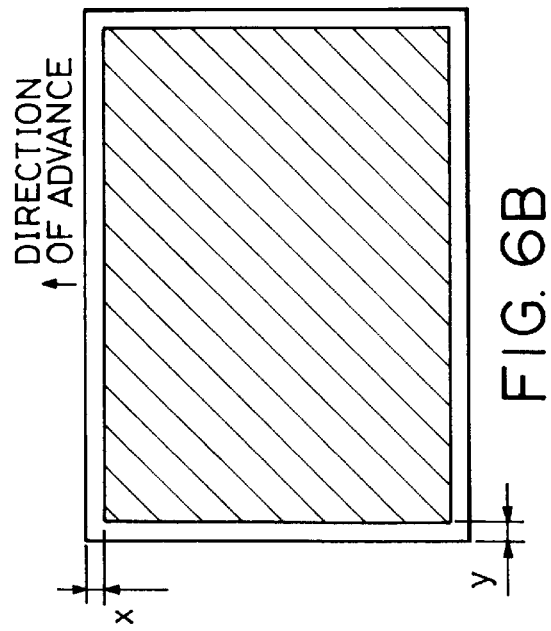
Figure 6B:
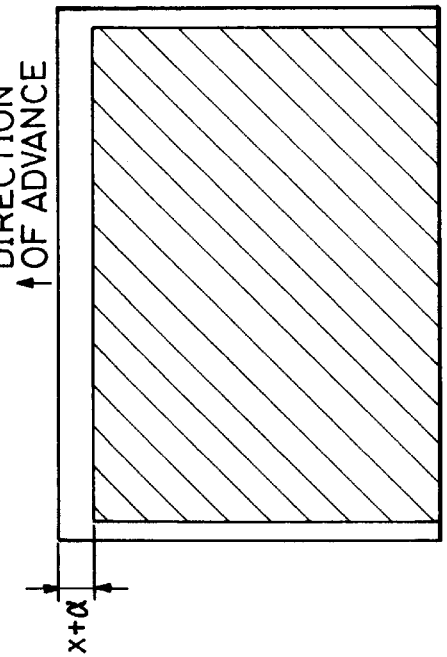

FIG. 4 shows a second embodiment of the present invention. In the first embodiment, the transfer belt is used as the recording material transport means while a transfer drum is used as the recording material transport means in the second embodiment. The rest of the construction of the second embodiment remains unchanged from that of the first embodiment. Like reference numerals are employed to designate like elements.

FIG. 4 is a cross-sectional view of a full-color copying machine that uses the transfer drum.

Since the image forming process used herein is the known one, no detailed explanation is given. A latent image is formed on the photoconductive drum 6 by a laser and is then subjected to the development step at each of development units.

The copy sheet as the recording material is supplied from the cassette 1a, 1b or the manual-feeding unit 1c, and is corrected in skew by the registration roller 2. The copy sheet then advances to the transfer drum 18 which electrostatically attracts it through attracting means. Images sequentially developed on the photoconductive drum 6 are transferred to the copy sheet by the transfer charging unit 9 charged up by a high tension voltage while the transfer drum 18 rotates in the direction of the arrow shown. This process is repeated four times to superimpose four colors of yellow, magenta, cyan and black on the recording material. The copy sheet is then detached from the transfer drum, and is introduced into the fixing unit 12 where the images are thermally fused for fixing. The copy sheet is then delivered out of the apparatus body into the tray 20.

The general image forming process has been described. In the second embodiment, a linear sensor 50 for detecting an edge of the recording material on the transfer drum 18 is arranged between the registration roller 2 and the transfer position. The timing of the latent image forming on the photoconductive drum 6 is controlled based on the detected signal in the same way as the first embodiment. The image forming position to the copy sheet is thus accurately determined.

The present invention is not limited to the above embodiments and allows changes and modifications without departing from the spirit and scope of the present invention.

What is claimed is:

1. An image forming apparatus for forming an image on a recording material, comprising:

image forming means for forming the image on the recording material at an image forming position;

correct means for correcting a skew of the recording material that moves toward the image forming position;

detector means located downstream of said correct means in a direction of advance of the recording material for detecting a position of at least one side edge of the recording material that moves from the position of said correct means to the image forming position; and control means for controlling said image forming means in accordance with an output of said detector means.

2. An image forming apparatus according to claim 1, wherein said detector means further detects a position of a leading edge of the recording material.

3. An image forming apparatus according to claim 2, wherein said image forming means comprises an image bearing member and image write means for writing the image onto said image bearing member, and wherein said control means controls the timing of the image writing by said write means in accordance with the output of said detector means.

4. An image forming apparatus according to claim 3, wherein said control means controls the writing timing to correct the position of the image on the recording material in the direction of advance of the recording material.

5. An image forming apparatus according to claim 3, wherein said control means controls the writing timing to correct the position of the image on the recording material in the direction perpendicular to the direction of advance of the recording material.

6. An image forming apparatus according to claim 1, wherein said detector means is a linear sensor that is extended perpendicular to the direction of advance of the recording material.

7. An image forming apparatus according to claim 6, wherein said linear sensor is a charge coupled device.

8. An image forming apparatus according to claim 1, wherein said correct means comprises a registration roller.

9. An image forming apparatus according to claim 1, further comprising a transfer conveyor, located downstream of said correct means, for transporting the recording material through the image forming position, wherein said detector means is positioned to detect the recording material as the recording material is being transported by said transfer conveyor.

10. An image forming apparatus according to claim 9, wherein said transfer conveyor is one of a transfer belt and a transfer drum.

11. An image forming apparatus for forming an image on a recording material, comprising:

image forming means for forming the image on the recording material at an image forming position;

a recording material conveyer for conveying the recording material to the image forming position, wherein said conveyer holds and moves together with the recording material;

detector means for detecting a position of the recording material held on said conveyer; and control means for controlling said image forming means in accordance with an output of said detector means.

12. An image forming apparatus according to claim 11, wherein said detector means detects a position of at least one side edge of the recording material.

13. An image forming apparatus according to claim 11, wherein said detector means detects a position of a leading edge of the recording material.

14. An image forming apparatus according to claim 11, wherein said image forming means comprises an image bearing member and image write means for writing the image onto said image bearing member, and wherein said control means controls a timing of an image writing by said write means in accordance with the output of said detector means.

15. An image forming apparatus according to claim 11, further comprising a correct means for correcting a skew of the recording material moving toward the image forming position, and wherein said detector means is located downstream of said correct means in a direction of advance of the recording material.

16. An image forming apparatus according to claim 15, wherein said correct means comprises a registration roller.

17. An image forming apparatus according to claim 11, wherein said conveyer holds the recording material electrostatically.

18. An image forming apparatus according to claim 11, wherein said detector means comprises a linear sensor that is extended perpendicular to the direction of advance of the recording material.

19. An image forming apparatus according to claim 18, wherein said linear sensor comprises a charge coupled device.

* * * * *

UNITED STATES PATENT AND TRADEMARK OFFICE
CERTIFICATE OF CORRECTION

PATENT NO. : 6,052,552
DATED : April 18, 2000
INVENTOR(S) : KIYOTAKA OHSUMI, ET AL.

It is certified that error appears in the above-identified patent and that said Letters Patent is hereby corrected as shown below:

ON THE COVER PAGE: At item [56] References Cited; Under "FOREIGN PATENT DOCUMENTS":
 "8095432" should read --8-095432--.
 "8305098" should read --8-305098--.

IN THE DISCLOSURE:
COLUMN 2:
 Line 57, "is" should be deleted.

Signed and Sealed this

Twenty-fourth Day of April, 2001

Attest:

NICHOLAS P. GODICI

Attesting Officer    Acting Director of the United States Patent and Trademark Office